US008687075B2

(12) United States Patent
Nakata et al.

(10) Patent No.: US 8,687,075 B2
(45) Date of Patent: Apr. 1, 2014

(54) IMAGING APPARATUS AND INFORMATION DISPLAY METHOD FOR IMAGING APPARATUS

(75) Inventors: Keisuke Nakata, Kyoto (JP); Senichi Onoda, Osaka (JP); Jun Takemura, Osaka (JP)

(73) Assignee: Panasonic Corporation, Osaka (JP)

( * ) Notice: Subject to any disclaimer, the term of this patent is extended or adjusted under 35 U.S.C. 154(b) by 303 days.

(21) Appl. No.: 13/049,162

(22) Filed: Mar. 16, 2011

(65) Prior Publication Data

US 2011/0279696 A1 Nov. 17, 2011

(30) Foreign Application Priority Data

Mar. 17, 2010 (JP) ................................. 2010-060593

(51) Int. Cl.
*H04N 5/225* (2006.01)
*H04N 5/222* (2006.01)
*H04N 5/77* (2006.01)

(52) U.S. Cl.
USPC ............... 348/220.1; 348/333.04; 386/225

(58) Field of Classification Search
USPC .............. 348/220.1, 333.01, 333.02, 333.04; 386/225
See application file for complete search history.

(56) References Cited

U.S. PATENT DOCUMENTS

| 5,905,528 | A * | 5/1999 | Kodama ..................... 348/220.1 |
| 6,243,531 | B1 * | 6/2001 | Takeuchi et al. .............. 386/224 |
| 7,768,553 | B2 * | 8/2010 | Kamiya ..................... 348/220.1 |
| 8,228,393 | B2 * | 7/2012 | Aoki et al. .................. 348/220.1 |
| 2007/0115368 | A1 | 5/2007 | Kamiya |
| 2011/0242360 | A1 * | 10/2011 | Mori .......................... 348/231.1 |

FOREIGN PATENT DOCUMENTS

| JP | 2000-299800 | 10/2000 |
| JP | 2004-350129 | 12/2004 |
| JP | 2005-318261 | 11/2005 |
| JP | 2006-303641 | 11/2006 |
| JP | 2007-142793 | 6/2007 |

* cited by examiner

*Primary Examiner* — Daniel M Pasiewicz

(74) *Attorney, Agent, or Firm* — Panasonic Patent Center

(57) ABSTRACT

An imaging apparatus, which is capable of recording a still image during a moving image recording operation, includes a display unit, an operation unit configured to receive an instruction from a user, and a controller configured to control the display unit to display information about a number of recordable still image data, when the operation unit receives a predetermined instruction during a moving image recording operation.

7 Claims, 4 Drawing Sheets

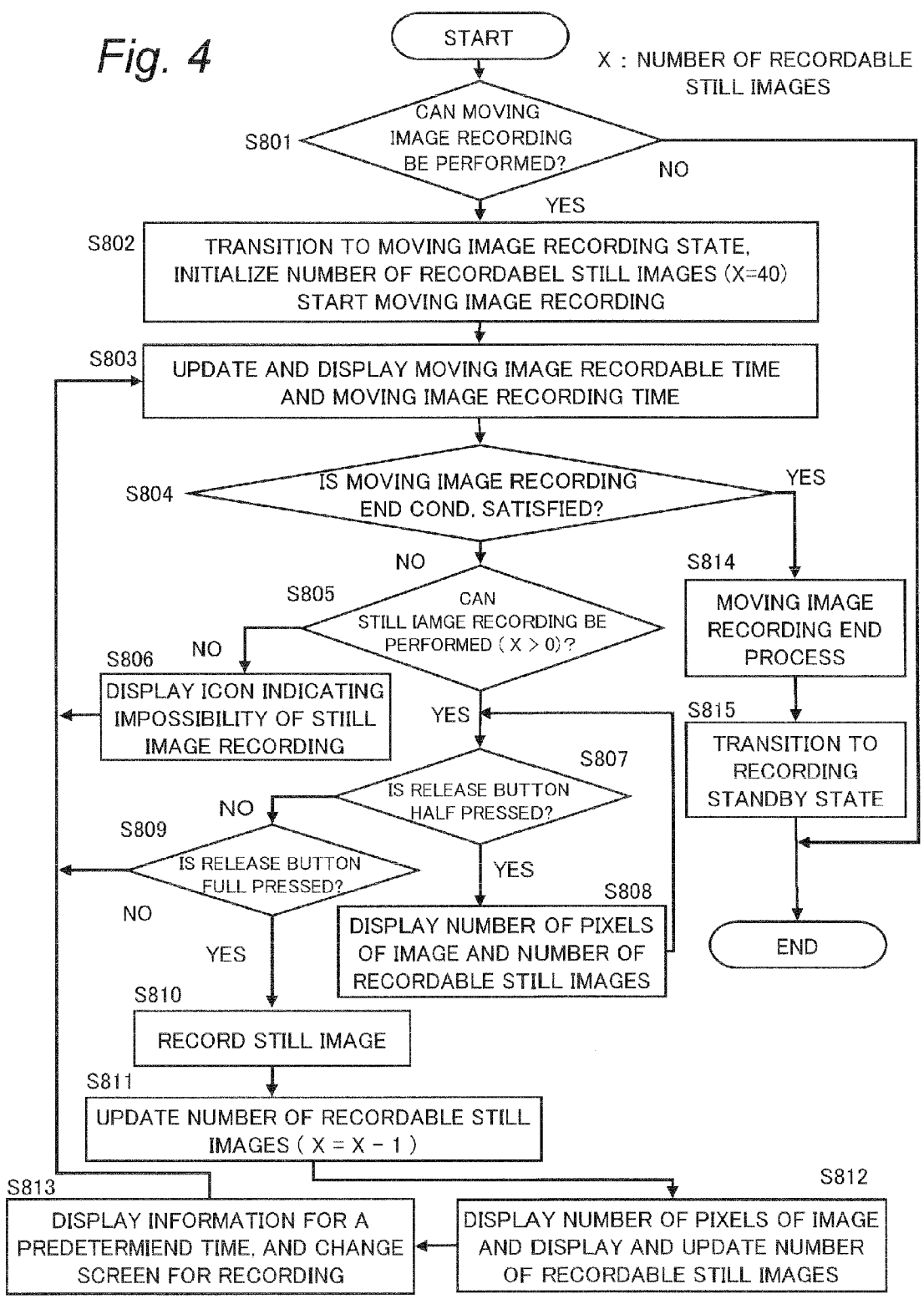

IMAGING APPARATUS AND INFORMATION DISPLAY METHOD FOR IMAGING APPARATUS

BACKGROUND

1. Technical Field

The technical field relates to an imaging apparatus including a moving image recorder, and more particularly to an imaging apparatus capable of recording a still image during recording of a moving image.

2. Related Art

Some imaging apparatuses have a function enabling recording a still image during recording of a moving image. When recording a still image using such an imaging apparatus during the moving image recording, information on the number of recordable still images is very useful for a user. For example, JP2007-142793A discloses an imaging apparatus that displays, during recording of a moving image, an icon which indicates the number of recordable still images during the recording of a moving image.

In addition, information on the moving image recording time and the remaining moving image recordable time is also useful for the user, during recording of a moving image. An imaging apparatus that displays such information during recording of a moving image is generally known.

In an imaging apparatus capable of recording a still image during recoding of a moving image, both a moving image and a still image can be recorded by selectively switching therebetween as needed. Thus information about the moving image recording and information about the still image recording are both useful for the user. However, the screen size of a display unit of the imaging apparatus is generally small. Thus, when those pieces of information are displayed on the display unit of the imaging apparatus at the same time, lots of pieces of information are displayed on the screen to reduce the visibility of a subject on the display unit so that a problem occurs in lowering user convenience.

Hence, it is desirable for an imaging apparatus capable of recording a still image during recording of moving image to present information about the number of recordable still images, and so on, to the user without lowering user convenience.

To solve the above-described problem, an imaging apparatus is provided, that can record a still image during recording of a moving image, and that can suitably notify a user of the number of recordable still images during the recording of a moving image.

SUMMARY in a first aspect, an imaging apparatus is provided, which is capable of recording a still image during a moving image recording operation. The imaging apparatus includes a display unit, an operation unit configured to receive an instruction from a user, and a controller configured to control the display unit to display information about a number of recordable still image data, when the operation unit receives a predetermined instruction during a moving image recording operation.

In a second aspect, an information display method is provided for an imaging apparatus capable of recording a still image during a moving image recording operation. The information display method includes starting a moving image recording operation in the imaging apparatus, and displaying information about a number of recordable still image data on a display unit of the imaging apparatus when a predetermined instruction is received through an operation unit of the imaging apparatus during the moving image recording operation.

According to the imaging apparatus of the above aspects, when a predetermined instruction is provided from a user during moving image recording, the number of recordable still images is displayed. Hence, the user can recognize information on the number of recordable still images at a timing desired by the user.

BRIEF DESCRIPTION OF DRAWINGS

FIG. 4 is a flowchart showing a flow of a process from start to completion of recording of a moving image.

DETAILED DESCRIPTION OF PREFERRED EMBODIMENTS

1. First Embodiment

A digital camera to be described below displays, at the start of moving image recording, a screen for recording a moving image on a liquid crystal display. When a user takes a still image during the moving image recording, the digital camera stores information on the still image in a buffer memory. The stored information on the still image is outputted to a recording medium such as a memory card when the moving image recording is completed. Details of the configuration and operation of the digital camera are described below.

1-1. Configuration 1-1-1. Configuration of a Digital Camera

Figure 1:
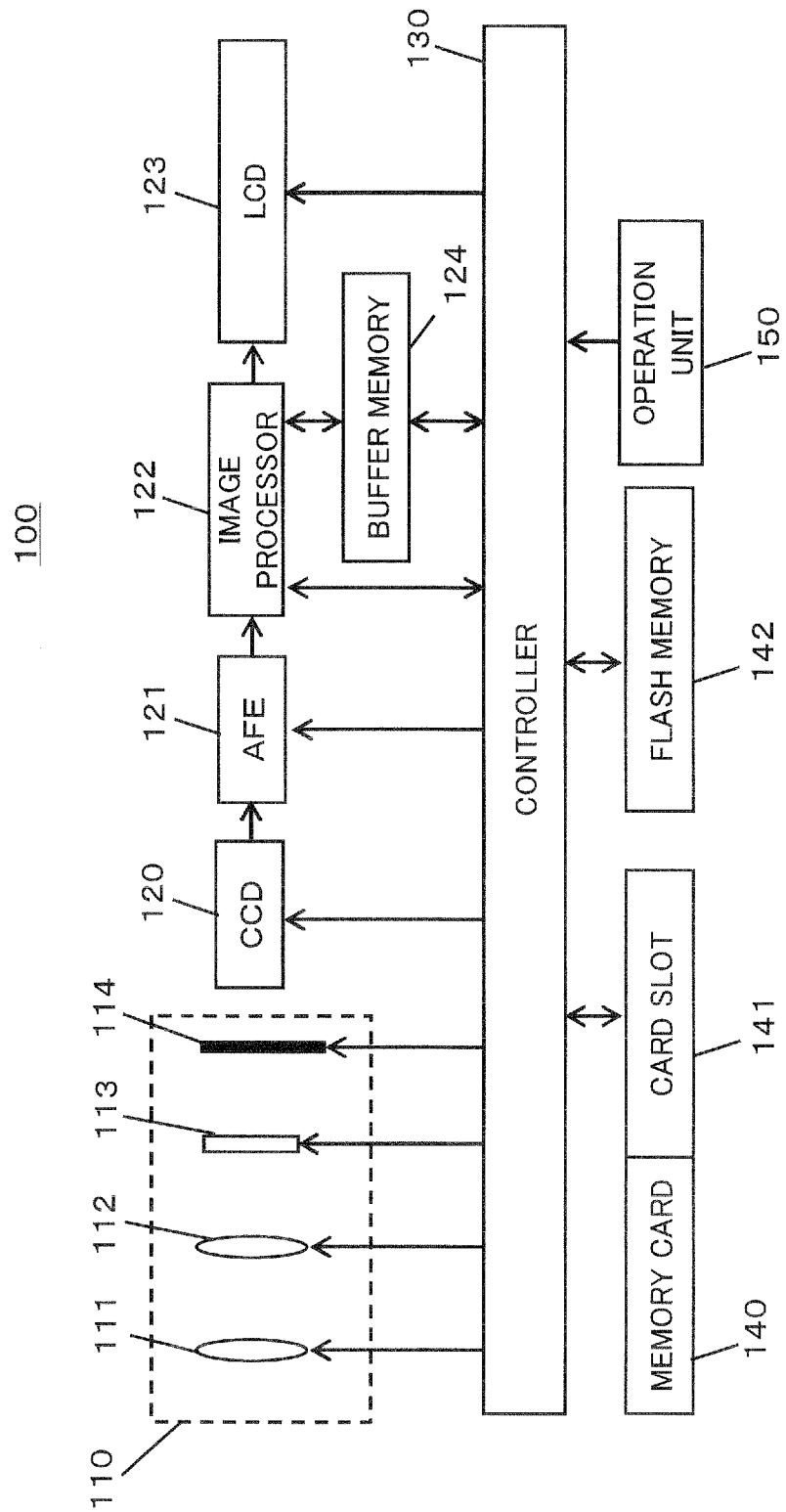
FIG. 1 is an electrical configuration diagram of a digital camera 100.

A configuration of a digital camera according to the present embodiment is described using FIG. 1. A digital camera 100 captures a subject image formed through an optical system 110 on a CCD image sensor 120. The CCD image sensor 120 generates image data based on the captured subject image. The image data generated by the capturing is subjected to various processes by a preprocessor (AFE: Analog Front End) 121 and an image processor 122. The image data is stored in a flash memory 142 or a memory card 140. The image data stored in the flash memory 142 or the memory card 140 is reproduced and displayed on a liquid crystal display (LCD) 123 in response to an operation made on an operation unit 150 by a user.

The optical system 110 includes a focus lens 111, a zoom lens 112, a diaphragm 113, a shutter 114, and so on. The optical system 110 may include an optical camera shake correction lens, OIS (Optical Image Stabilizer). Note that each lens included in the optical system 110 may be composed of any number of lenses and may be of any number of groups of lenses.

The focus lens 111 is used to adjust the focal length. The zoom lens 112 is used to adjust the zoom in/zoom out magnification. The diaphragm 113 is used to adjust the amount of light entering the CCD image sensor 120. The shutter 114 adjusts the exposure time of light entering the CCD image sensor 120. The focus lens 111, the zoom lens 112, the diaphragm 113, and the shutter 114 have their respective drivers (not shown) such as DC motors or stepping motors. The drivers are driven according to control signals provided from a controller 130.

The CCD image sensor 120 captures a subject image formed through the optical system 110 to generate image data. The CCD image sensor 120 generates image data for a new frame every predetermined period. In addition, the CCD image sensor 120 can adjust the amount of exposed light by an electronic shutter operation.

The preprocessor (AFE) 121 performs processes, such as correlated double sampling and gain adjustment, on the image data generated by the CCD image sensor 120. In addition, the preprocessor (AFE) 121 converts image data in analog format to image data in digital format. Thereafter, the preprocessor 121 outputs the image data to the image processor 122.

The image processor 122 performs various processes on the image data. The various processes include gamma correction, white balance correction, a YC conversion process, an electronic zoom process, a compression process, a decompression process, and the like, but are not limited thereto. Some of those processes may be omitted. The image processor 122 may be composed of, for example, a hard-wired electronic circuit or a microcomputer using a program. Alternatively, the image processor 122 may be composed of a single semiconductor chip, together with the controller 130, and the like.

The controller 130 performs control of the entire operation of the digital camera 100. The controller 130 includes a ROM (not shown) that stores information such as programs, a CPU (not shown) that performs various processes by executing a program, and the like. The ROM stores a program for performing overall control of the entire operation of the digital camera 100, in addition to programs for focus control and exposure control.

The controller 130 may be composed of, for example, a hard-wired electronic circuit or a microcomputer. Alternatively, the controller 130 may be formed on a single semiconductor chip, together with the image processor 122, and the like. The RCM does not need to be provided within the controller 130 and may be provided outside the controller 130.

A buffer memory 124 is a storage unit which functions as a working memory for the image processor 122 and the controller 130. The buffer memory 124 can be implemented by a DRAM (Dynamic Random Access Memory), and the like.

The flash memory 142 functions as an internal memory for storing image data, and the like. The controller 130 stores image data processed by the image processor 122 in the flash memory 142 or the memory card 140.

A card slot 141 is a connector that can mount the memory card 140. The card slot 141 can allow the memory card 140 to be electrically and mechanically connected thereto. The card slot 141 may have the function of controlling the memory card 140.

The memory card 140 is an external memory including therein a storage unit such as a flash memory. The memory card 140 can store data such as image data processed by the image processor 122. In the present embodiment, the following description is made assuming that data such as image data is stored in the memory card 140. Although in the present embodiment the memory card 140 is shown as an example of the external memory, the external memory is not limited thereto. For example, a storage medium such as an optical disk may be used as an external memory.

Figure 2:
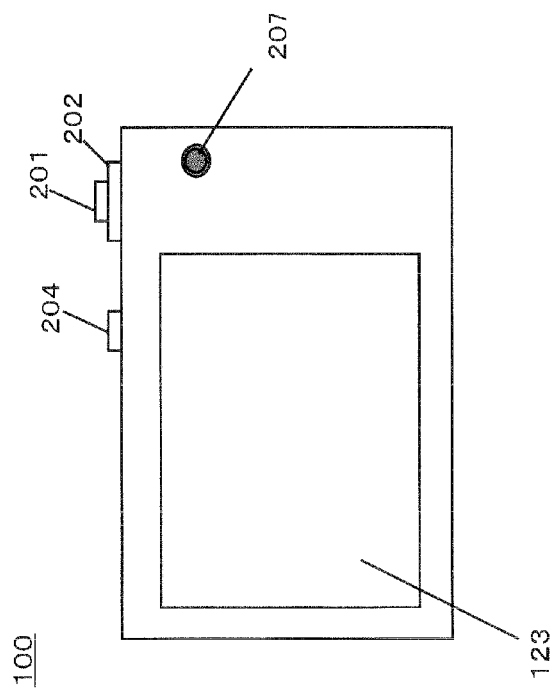
FIG. 2 is a configuration diagram of the back of the digital camera 100.

The operation unit 150 is a general term for operating buttons and an operating dial provided on the exterior of the digital camera 100, and receives operations performed by the user. The operation unit 150 includes, for example, a release button 201, a zoom dial 202, a power button 204, and a movie record button 207, such as those shown in FIG. 2. When the operation unit 150 receives an operation performed by the user, the operation unit 150 provides an operation instruction signal to the controller 130 according to the operation.

The liquid crystal display 123 is provided on the back of the digital camera 100. The liquid crystal display 123 displays an image created based on image data which is processed by the image processor 122. Images displayed on the liquid crystal display 123 include through images and recorded images. The through image is an image for each of new frames which are created every predetermined period by the CCD image sensor 120 and is continuously displayed. By referring to a through image displayed on the liquid crystal display 123, the user can perform recording while checking the composition of a subject. The recorded image is an image recorded in the memory card 140 or the flash memory 142. The liquid crystal display 123 displays (plays back) an image created based on recorded image data, according to an operation performed by the user. In addition, the liquid crystal display 123 can display the setting conditions of the digital camera 100, and the like, in addition to images.

1-1-2. Term Correspondence

The liquid crystal display 123 is an example of a display unit. The controller 130 is an example of a recording unit and a controller. The digital camera 100 is an example of an imaging apparatus. The flash memory 142 and the memory card 140 are examples of a recording medium.

1-2. Operation

The operation of the digital camera 100 will be described. Note that, in the following, description of those operations unrelated to a moving image recording operation (e.g., a still image recording operation performed from a standby state, an image data playback operation, various setting operations, and the like) is omitted.

The digital camera 100 according to the present embodiment has the function of being able to record still images during a moving image recording operation. When the digital camera 100 performs a still image recording operation during a moving image recording operation, the digital camera 100 temporarily records data on captured still images in the buffer memory 124. Then, when the moving image recording operation is completed, the digital camera 100 reads the still image data from the buffer memory 124 and records the still image data in the memory card 140. At the start of moving image recording, it needs to reserve, in the memory card 140, a recording area of a size corresponding to the maximum amount of still image data that can be recorded in the buffer memory 124, taking into account such transfer of still image data from the buffer memory 124. In the digital camera 100 according to the present embodiment, the maximum value of the number of still images recordable during moving image recording is 40. Thus, at the start of moving image recording, capacity that is obtained by subtracting the amount of data corresponding to 40 still images from the free space of the memory card 140 is capacity usable for moving age recording. Based on the capacity, a period for which a moving image can be recorded in the memory card 140 is calculated.

Figure 3:
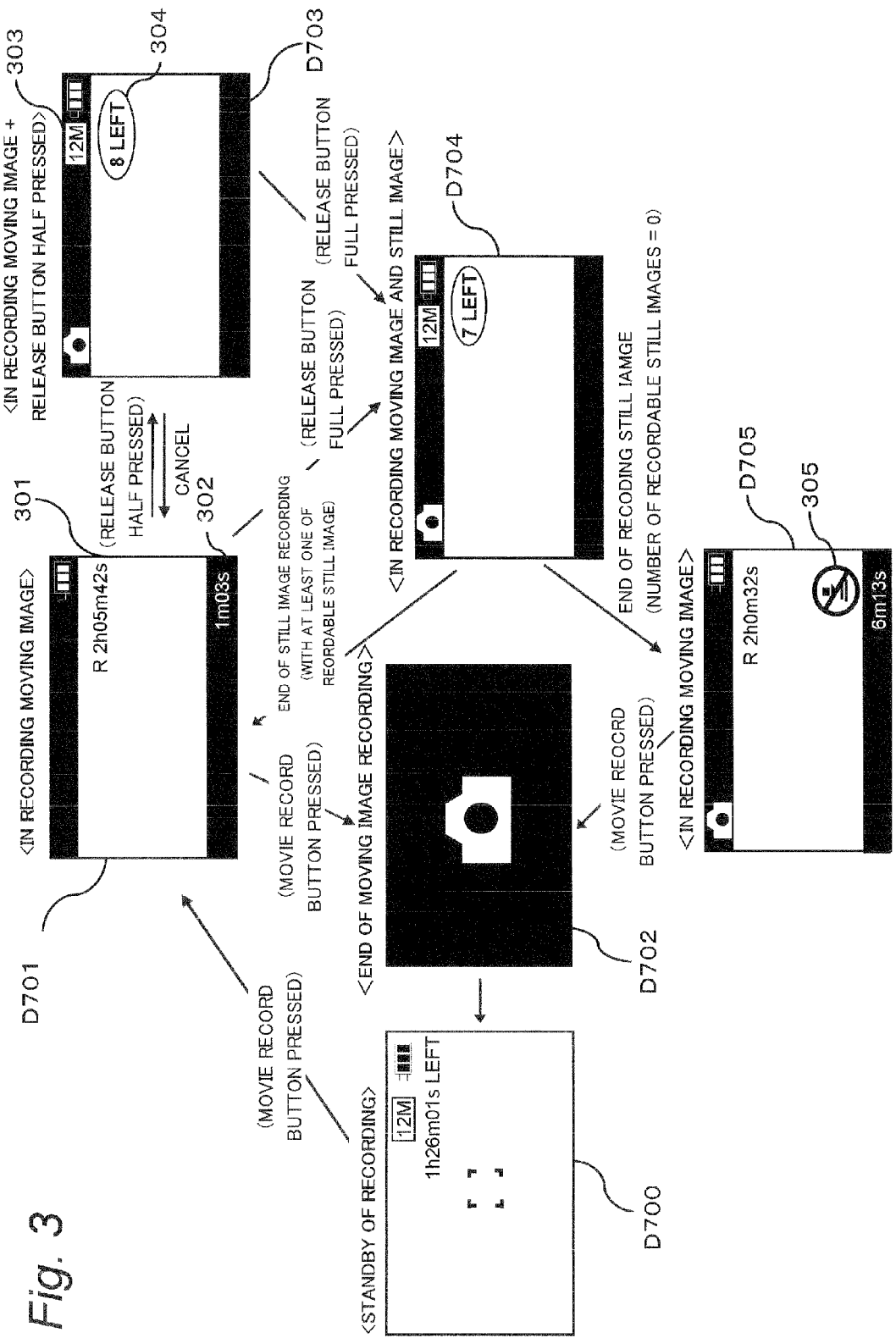
FIG. 3 is a state transition diagram from start to completion of recording of a moving image.

1-2-1. Various States of the Digital Camera for a Moving Image Recording Operation First, various states of the digital camera 100 which the digital camera 100 can take for a moving image recording operation will be described. FIG. 3 is a state transition diagram for a moving image recording operation of the digital camera 100. FIG. 3 shows examples of screens in various states which are displayed on the liquid crystal display 123. The digital camera 100 according to the present embodiment can take the following six states:

1) Recording standby state D700;

2) Moving image recording state D701 (still image recording can be performed);

3) Moving image recording end state D702;

4) Half-press state during moving image recording D703;

5) Still image recording state D704; and

6) Moving image recording state D705 (still image recording cannot be performed).

The recording standby state D700 is a state of waiting for an instruction for start of recording which is provided by user's pressing the release button 201, or for an instruction for start of a moving image recording which is provided by user's pressing the movie record button 207. In the recording standby state D700, when the movie record button 207 is pressed by the user, a moving image recording start condition, such as a determination as to whether the free space of the memory card 140 is greater than or equal to the capacity that allows moving image recording, is checked. Only when the moving image recording start condition is satisfied, the digital camera 100 transitions to the moving image recording state D701.

The moving image recording state D701 is a state in which the digital camera 100 is performing a moving image recording operation. In the moving image recording state D701, the digital camera 100 displays the moving image recordable time and the moving image recording time on the liquid crystal display 123.

The moving image recordable time is a period for which a moving image can be recorded in the memory card 140. The initial value of the moving image recordable time is set to a value that is obtained by subtracting the capacity of the buffer memory 124 corresponding to the maximum number of still images recordable during the moving image recording from the free space of the memory card 140 and then dividing the resulting value by a bit rate. An indication 301 "R2 h05 m42 s" (2 hours 5 minutes 42 seconds) in the moving image recording state D701 shown in FIG. 3 is an indication of the moving image recordable time. The moving image recording time is a period that has elapsed from the start of the moving image recording. A display 302 "1 m 03 s" (1 minute 3 seconds) in the moving image recording state D701 shown in FIG. 3 is display of the moving image recording time.

After the start of the moving image recording, the digital camera 100 continues the moving image recording until the movie record button 207 is pressed again by the user or the free space of the memory card 140 runs out or a moving image recording end condition, such as a transition from the recording mode to another mode, is satisfied.

When the release button 201 is half-pressed by the user in the moving image recording state D701, the digital camera 100 transitions to the half-press state during moving image recording D703.

In the half-press state during moving image recording D703, the number of picture pixels and the number of recordable still images for still image recording are displayed on the liquid crystal display 123. The number of picture pixels is the number of pixels for recording a still image, which is to be set. An indication 303 "12M" (about 12 million pixels) in the half-press state D703 shown in FIG. 3 is an indication of the number of picture pixels. The number of recordable still images, is the remaining number of still images recordable during the moving image recording. An indication 304 "8 LEFT" in the half-press state D703 shown in FIG. 3 is provided as the number of recordable still images. When the liquid crystal display 123 displays the number of picture pixels and the number of recordable still images as shown in FIG. 3, the moving image recordable time and the moving image recording time are not displayed.

When the user releases (does not press at all) the release button 201 in the half-press state D703 during moving image recording, the digital camera 100 transitions to the moving image recording state D701 and displays the moving image recordable time and the moving image recording time again on the liquid crystal display 123. While the liquid crystal display 123 displays the moving image recordable time and the moving image recording time, the number of picture pixels for still image recording and the number of recordable still images are not displayed. As such, the digital camera 100 is configured to display either one of a combination of the number of picture pixels and the number of recordable still images and a combination of the moving image recordable time and the moving image recording time, according to a state thereof. Such display control is performed at all times during the moving image recording.

When the user full presses the release button 201 (i.e., when the user instructs to record a still image) in the moving image recording state D701 or the half-press state D703 during moving image recording, the digital camera 100 transitions to the still image recording state P704. After transitioning to the still image recording state D704, the digital camera 100 captures a still image and records information on the still image in the buffer memory 124. Correspondingly, the controller 130 updates the number of recordable still images and displays the updated number of recordable still images on the liquid crystal display 123. Thereafter, the digital camera 100 continues to display the number of picture pixels for a still image and the number of recordable still images on the liquid crystal display 123, for a predetermined period.

In the still image recording state D704, after displaying the number of recordable still images for a predetermined period, if the number of recordable still images is one or more, then the digital camera 100 transitions to the moving image recording state D701. If the number of recordable still images is zero, then the digital camera 100 transitions to the moving image recording state D705 where an icon indicating impossibility of still image recording is displayed to display the moving image recordable time and the moving image recording time on the liquid crystal display 123. As shown in FIG. 3, in the moving image recording state D705, an icon indicating impossibility of still image recording 305 is displayed on the liquid crystal display 123. This icon 305 allows the user to easily confirm that he/she cannot perform further still age recording.

When the above-described moving image recording end condition is satisfied in the moving image recording state D701 or the moving image recording state D705, the digital camera 100 transitions to the moving image recording end state S102 and performs a moving image recording end process. The moving image recording end process includes, for example, a process of outputting information on a moving image and still images which are temporarily recorded in the buffer memory 124 and not yet recorded in the memory card 140, to the memory card 140, and a process of making the icon indicating impossibility of still image recording to disappear, when the icon is displayed on the liquid crystal display 123. When the moving image recording end process is completed in the moving image recording end state D702, the digital camera 100 transitions to the recording standby state D700 again.

1-2-2. Operation Flow for Moving Image Recording of the Digital Camera

FIG. 4 is an operation flowchart for recording a moving image by the digital camera 100. In the recording standby state D700, the controller 130 waits until the movie record button 207 is pressed by the user. The flowchart shown in FIG. 4 shows an operation performed when the movie record button 207 is pressed by the user in the recording standby state D700.

When the movie record button 207 is pressed in the recording standby state D700, the controller 130 determines whether moving image recording can be performed based on the remaining capacity of the memory card 140, or the like (S801). If it is determined that moving image recording cannot be performed due to insufficient capacity, or the like, then the controller 130 ends this process without starting a moving image recording operation, and keeps the recording standby state D700.

On the other hand, if it is determined that moving image recording can be performed, then the controller 130 displays a screen for moving image recording on the liquid crystal display 123, and initializes the number of recordable still images. In this example, the number of recordable still images is initialized to 40. In addition, the controller 130 controls each processor to start moving image recording and allows the digital camera 100 to transition to the moving image recording state D701 (S802). Note that the moving image recording operation is performed in parallel with the processes shown in the flowchart in FIG. 4 until the moving image recording end process is performed.

Thereafter, the controller 130 updates the moving image recordable time and the moving image recording time based on the remaining capacity of the memory card 140 at this point in time, and displays them on the liquid crystal display 123 (S803). Note that, after starting the moving image recording, the controller 130 repeats those processes after step S803 at a predetermined cycle. The predetermined cycle is, for example, 1/60 second. Note also that either one of the moving image recordable time and the moving image recording time may be displayed.

The controller 130 then determines a moving image recording end condition (S804). If the moving image recording end condition is satisfied (YES at step S804), then the digital camera 100 transitions to the moving image recording end state D702 and performs the moving image recording end process (S814). The moving image recording end process includes a process of transferring still image data from the buffer memory 124 to the memory card 140, and a process of making the icon indicating impossibility of still image recording to disappear when the icon is displayed on the liquid crystal display 123. Thereafter, the controller 130 allows the digital camera 100 to transition to the recording standby state D700 (S815).

On the other hand, if the moving image recording end condition is not satisfied (NO at step S804), then the controller 130 determines, based on the number of recordable still images X, whether still image recording can be performed (S805). Specifically, when the number of recordable still images X is greater than 0, it is determined that still image recording can be performed.

If it is determined that still image recording cannot be performed (NO at step S805), then the controller 130 makes the liquid crystal display 123 to display an icon indicating impossibility of still image recording, allows the digital camera 100 to transition to the moving image recording state D705 where an icon indicating impossibility of still image recording is added (S806), and returns to step S803. On the other hand, if it is determined that still image recording can be performed (YES at step S805), then the controller 130 determines whether the release button 201 has been half-pressed (S807).

If it is determined that the release button 201 has been half-pressed (YES at step S807), then the controller 130 makes the digital camera 100 transition to the half-press state D703 during moving image recording, and displays the number of picture pixels of a still image and the number of recordable still images on the liquid crystal display 123 (S808). Note that at this time either one of the number of picture pixels of a still image and the number of recordable still images may be displayed. Thereafter, a determination for a half-press of the release button 210 is made in a predetermined cycle (step S807).

On the other hand, if it is determined that the release button 201 has not been half-pressed (NO at step S807), then the controller 130 determines whether the release button 201 has been full-pressed (S809).

If it is determined that the release button 201 has been full-pressed (YES at step S809), then the controller 130 makes the digital camera 100 transition to the still image recording state D704 during moving image recording. Thereafter, the controller 130 controls each processor in the above-described manner to record a still image (S810), decrement 1 from the number of recordable still images X (S811), and displays the number of pixels of a still image and the updated number of recordable still images X on the liquid crystal display 123 (S812). After displaying such information for a predetermined period, the controller 130 makes the digital camera 100 transition to either one of the moving image recording state D701 or the moving image recording state P705, according to the number of recordable still images X (S813), then returning to step S803.

On the other hand, if it is determined that the release button 201 has not been full-pressed (NO at step S809), the release button 201 is in a release state, and thus the controller 130 makes the digital camera 100 to transition to the moving image recording state D701, returning to step S803.

As described above, the digital camera 100 according to the first embodiment includes the liquid crystal display 123, the controller 130 that controls a process of computing the number of recordable still images and a determination as to whether still image recording can be performed during moving image recording, the buffer memory 124 that holds information on still images recorded during the moving image recording, the memory card 140 to which the information on still images is outputted after completion of the moving image recording, and the operation unit 150 that receives operations performed by a user and performs start and end of moving image recording, and recording of a still image. The digital camera 100 is an electronic device capable of performing still image recording during moving image recording. The digital camera 100 holds, in the buffer memory 124, information on still images recorded when still image recording is performed, and outputs the information on still images held in the buffer memory 124 to the memory card 140 when moving image recording is completed.

When the number of still images newly recordable in the buffer memory 124 is zero, the controller 130 displays an icon indicating that any further still image recording cannot be performed during moving image recording, on the liquid crystal display 123. In addition, the controller 130 calculates the number of recordable still images from the remaining capacity of the buffer memory 124, and displays the number of recordable still images on the liquid crystal display 123.

As such, according to the present embodiment, displaying of information to be displayed on the liquid crystal display 123 is controlled taking into account the number of recordable still images, i.e., the number of still images recorded in the buffer memory 124. By this, information can be presented taking into account not only the remaining capacity of the recording medium but also the constraint of the electronic device.

1-3. Summary

As described above, the digital camera 100 according to the first embodiment is a digital camera capable of recording still image during moving image recording. The digital camera 100 includes the liquid crystal display 123; the operation unit 150 that receives an instruction from a user; and the controller 130 that controls the liquid crystal display 123 to display information about the number of recordable still image data, when the operation unit 150 receives half-press operation of a release button during a moving image recording operation.

By such a configuration, the digital camera 100 can notify a user of the remaining number of still images recordable during moving image recording, when a predetermined operation (a half-press of the release button) is performed by the user. By this configuration, during moving image recording, the digital camera 100 can display information such as the moving image recording time on the liquid crystal display 123 before the predetermined operation is performed, and switch information to be displayed on the liquid crystal display 123 to the number of recordable still images when the predetermined operation is performed. By this, only necessary information is displayed on the liquid crystal display 123, and thus, visibility is secured and the user can check the number of recordable still images at desired timing during moving image recording, enabling to improve user convenience.

When the number of still image data recordable in the buffer memory 124 is zero, the controller 130 makes the liquid crystal display 123 to display an icon indicating that still image recording cannot be performed. By this configuration, the user can easily confirm that he/she cannot record another still image.

In addition, the digital camera 100 includes the operation unit 150 that receives a predetermined instruction from the user. When the operation unit 150 receives a predetermined instruction such as a half-press of the release button 201, the controller 130 makes the liquid crystal display 123 to display information about the number of still image data recordable in the buffer memory 124.

2. Other Embodiments

An embodiment is not limited to the above-described embodiment and various embodiments are considered. Other embodiments will be summarized below.

Although, in the first embodiment, still image data recorded in the buffer memory 124 is transferred to the memory card 140 when a moving image recording operation is completed, the still image data may be transferred to the memory card 140 in the middle of recording of the moving image.

Although, in the first embodiment, the CCD image sensor 120 is used as an example of an imaging device, the imaging device is not limited thereto. For example, as an imaging device, any other imaging device such as a CMOS image sensor or an NMOS image sensor may be used. The release button 201 may be implemented by other means, such as a touch panel to be operated, provided on the liquid crystal display 123. Provided that it is possible to notify the user of the number of recordable still images, instead of displaying the number of picture pixels and the number of recordable still images simultaneously during moving image recording, only the number of recordable still images may be displayed.

In the first embodiment, a combination of the number of picture pixels and the number of recordable still images and a combination of the moving image recordable time and the moving image recording time are exclusively displayed on the liquid crystal display 123. However, temporarily, at least one of the number of picture pixels and the number of recordable still images and at least one of the moving image recordable time and the moving image recording time may be displayed on the liquid crystal display 123 simultaneously.

Industrial Applicability

The idea of the above described embodiment is not limited to the application to a digital camera. Specifically, the idea of the above described embodiment can be applied to electronic devices including a display unit and having the function of recording still images during recording of moving image, such as a movie camera and a mobile phone.

What is claimed is:

1. An imaging apparatus capable of recording a still image during a moving image recording operation, the imaging apparatus comprising:
 a display unit;
 an operation unit configured to receive an instruction from a user; and
 a controller configured to control the display unit to display information about a number of recordable still image data, when the operation unit receives a predetermined instruction during a moving image recording operation,
 the predetermined instruction including a half-press instruction which is provided by user's half-pressing a release button and a full-press instruction which is provided by use's full-pressing a release button, the half-press instruction not causing stat of recording a still image, the full-press instruction causing stat of recording a still image, wherein:
 during recording of the moving image and displaying information about a recordable time of a moving image on the display unit,
 when the operation unit receives the half-press instruction, the controller switches information to be displayed on the display unit from the information about the recordable time of the moving image to information about the number of recordable still image data but does not start recording of a still image, or
 when the operation unit receives the full-press instruction, the controller switches information to be displayed on the display unit from the information about the recordable time of the moving image to the information about the number of recordable still image data and starts recording of the still image, and
 when the number of recordable still image data is zero, the controller controls the display unit to display a non-numerical mark which indicates that still image recording cannot be performed and information about the recordable time of the moving image.

2. The imaging apparatus according to claim 1, further comprising:
 a buffer memory configured to temporarily store data of a still image recorded during the moving image recording operation; and
 a recording unit configured to record the still image data stored in the buffer memory to a predetermined recording medium, wherein
 the number of recordable still image data is a number of still image data recordable in the buffer memory.

3. An information display method for an imaging apparatus capable of recording a still image during a moving image recording operation, the information display method comprising:

starting a moving image recording operation in the imaging apparatus; and displaying information about a number of recordable still image data on a display unit of the imaging apparatus when a predetermined instruction is received through an operation unit of the imaging apparatus during the moving image recording operation, the predetermined instruction including a half-press instruction which is provided by a user's half-pressing a release button and a full-press instruction which is provided by the use's full-pressing a release button, the half-press instruction not causing start of recording a still image, the full-press instruction causing start of recording a still image, wherein:

during displaying of the information about a recordable time of a moving image on the display unit while the moving image is being recorded, when the half-press instruction is received through the operation unit, switching information to be displayed on the display unit from the information about the recordable time of the moving image to information about the number of recordable still image data, and not starting recording of a still image, or when the full-press instruction is received through the operation unit, switching information to be displayed on the display unit from the information about the recordable time of the moving image to the information about the number of recordable still image data, and starting recording of the still image, and when the number of recordable still image data is zero, controlling the display unit to display a non-numerical mark which indicates that still image recording cannot be performed and information about the recordable time of the moving image.

4. The information display method according to claim 3, further comprising:

temporarily storing, in a buffer memory, data of a still image recorded during the moving image recording operation, and thereafter, recording the still image data stored in the buffer memory to a predetermined recording medium, wherein the number of recordable still image data is a number of still image data recordable in the buffer memory.

5. A non-transitory computer readable storage medium storing a control program of an imaging apparatus capable of recording a still image during a moving image recording operation, the control program making a controller of the imaging apparatus to execute the functions of:

starting a moving image recording operation in the imaging apparatus; and controlling a display unit of the imaging apparatus to display information about a number of recordable still image data when a predetermined instruction is received through an operation unit of the imaging apparatus during the moving image recording operation, the predetermined instruction including a half-press instruction which is provided by a user's half-pressing a release button and a full-press instruction which is provided by the use's full-pressing a release button, the half-press instruction not causing start of recording a still image, the full-press instruction causing start of recording a still image, wherein:

during displaying of the information about a recordable time of a moving image on the display unit while the moving image is being recorded, when the half-press instruction is received through the operation unit, switching information to be displayed on the display unit from the information about the recordable time of the moving image to information about the number of recordable still image data, and not starting recording of a still image, or when the full-press instruction is received through the operation unit, switching information to be displayed on the display unit from the information about the recordable time of the moving image to the information about the number of recordable still image data, and starting recording of the still image, and when the number of recordable still image data is zero, controlling the display unit to display a non-numerical mark which indicates that still image recording cannot be performed and information about the recordable time of the moving image.

6. The imaging apparatus according to claim 1, wherein when the half-pressing is subsequently cancelled, the controller returns information to be displayed on the display unit to the information about the recordable time of the moving image.

7. The information display method according to claim 3, wherein when the half-pressing is subsequently cancelled, returning information to be displayed on the display unit to the information about the recordable time of the moving image.

* * * * *